Dec. 18, 1956 M. ALBERT 2,774,670
CEREAL FOOD AND METHOD
Filed Sept. 28, 1953
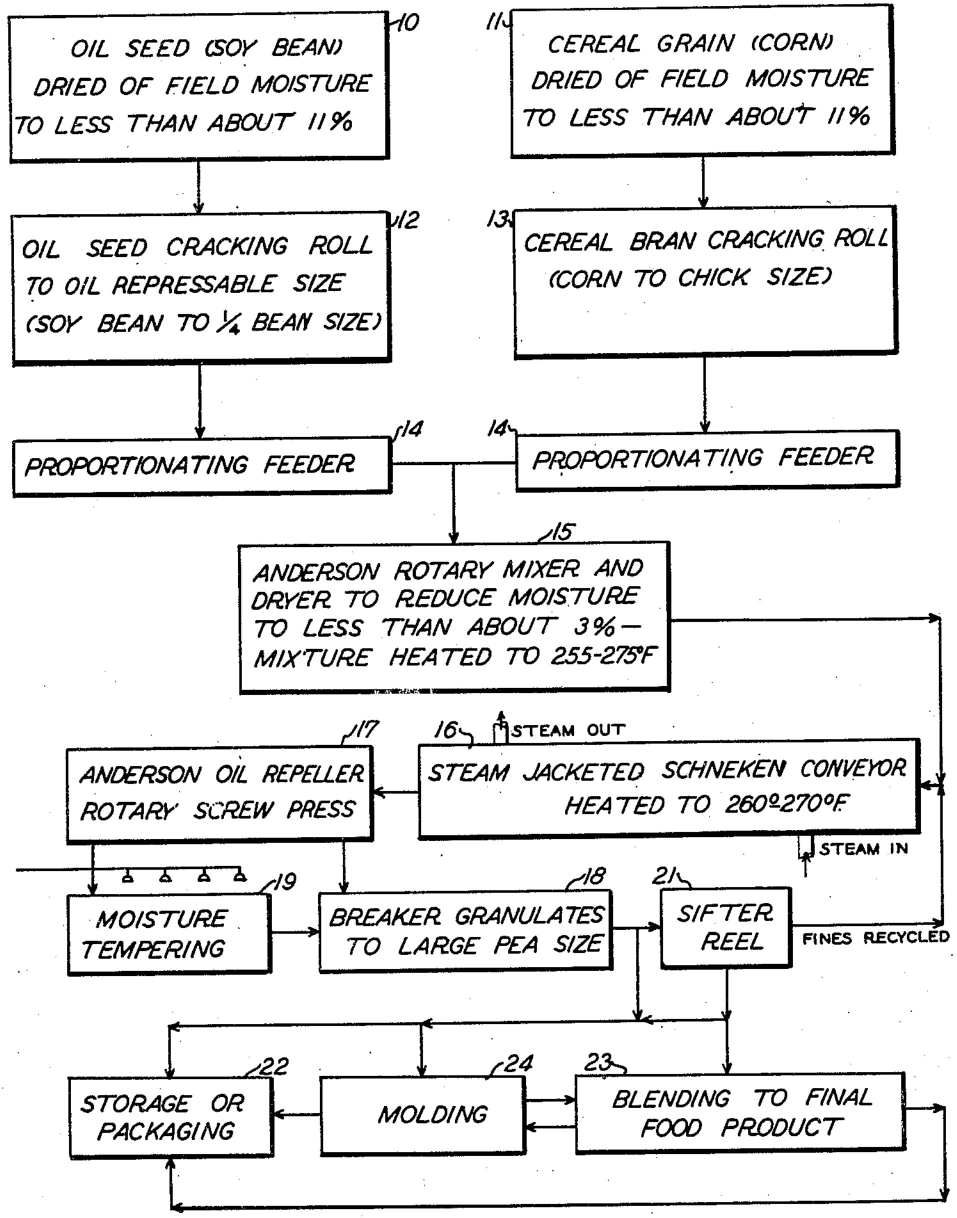
INVENTOR
MAX ALBERT
BY [signature]
[signature] ATTORNEY United States Patent Office 2,774,670

Patented Dec. 18, 1956

2,774,670

CEREAL FOOD AND METHOD

Max Albert, Galesburg, Ill.

Application September 28, 1953, Serial No. 382,679

16 Claims. (Cl. 99—2)

This invention relates to an improved cereal food or food base from which a food product may be compounded for human or animal food purposes.

More particularly, the invention relates to a food product and method of forming the same comprising a cereal grain base of the type which is normally low in fat content to which has been supplied additional vegetable oil in a manner to form thereof a homogeneous, high fat-containing cereal product, by compressing the cereal grain with an expressible oil bearing vegetable product, such as oil seed, in a manner to homogeneously redistribute the oil throughout the composite product.

According to the present invention, cereal grains such as corn, barley, wheat, oats, or rye and, where the product is to be used primarily for animal food purpose, composite grain and straw products which animals eat as fodder of the character of alfalfa, may be homogenously compressed with an edible oil seed of the type which contains oil in quantity sufficient to be expressible therefrom under pressure. The cereal grain normally low in edible oil, in relatively dry granular form, is mixed with the oil expressibly sized oil bearing seed as a homogeneous granular mixture of reduced moisture content, and then pressed under sufficient pressure to break the cellular structure of the granular mixture and redistribute the oil homogeneously throughout. In the process of pressing under pressure of the order usually necessary to cause the oil to flow and be redistributed throughout the mass of the mixture, the granular mixture has its cellular structure broken and becomes plastified to a caramelaceous, pressure flowable mass. The product formed is so completely homogenized to a "fusion weld" that each of the original components has lost its original structure and separate identity.

Proportions of oil seed to low oil containing cereal grain according to the present method is adjusted not only to build up the oil content of the cereal grain to a higher desirable oil content for human and animal food purposes such as from 3 to 6% in the composite, but these proportions are also so adjusted that no free oil is exuded from the mass. The composite product formed is an empirically dry homogeneous product of adjusted edible oil content eminently suitable as a food or food base. Moreover, in the pressure-redistribution of oils from oil bearing seed to low oil content cereal grains to form the composite, according to the present invention, the oil homogeneously mixes with the residual or normal oil already present in the low oil content cereal grain to desirably modify the character thereof while adjusting the total quantity of oil therein. The method serves further to redistribute the original oil while blending the same with additional oil homogeneously about each of the solid particles of protein and carbohydrate associated therewith.

Thus, for purposes of the present method the low oil content cereal grain may have added thereto the typical high oil content oil seed from which oil is normally expressed such as soy bean, cotton seed, flax seed, linseed, or rape seed or other edible oil seeds. The quantity of the oil seed is adjusted with respect to its natural oil content and with respect to that contained in the cereal grain, if any, to raise the oil content of the homogeneous composite product produced to a desirably high edible oil containing food base. The quantity of oil introduced into the composite will be limited to such that no oil will be actually expressed as free oil from the mixture during the pressing thereof. That is, the oil available from the oil seed will be adjusted by limiting the quantity of oil seed mixed with the grain seed to such as will not more than saturate the mixture under oil expelling pressure with edible oil and, preferably, the oil content of the mixture will be adjusted to the range of 3 to 6%. For animal foods such as dog food, the quantity of oil will preferably be adjusted to the range of 4½ to 5½%. For humans, the quanity of oil is preferably held to a maximum of about 4½%.

For this purpose, the quantity of oil seed is used in proportion of approximately 5 to 20% by weight of the mixture with the cereal grain, which constitutes the remainder of the composite food product or food base prior to admixture with other food additives. Within this range it will be understood that the quantity of the oil seed will vary depending upon the absorptive capacity of the cereal grain base and the quantity of oil available in the particular oil seed. Thus, for example, where corn is used as the cereal grain with a normal content of about 1% of oil, the oil content of the mixture may be raised to the range of about 4½% to5½% by mixing an oil seed therewith such as soy bean in proportion of about 5 to 20% soy bean with 80 to 95% of corn, preferably about 10 to 15% of soy bean with 85 to 90% of corn by weight, and compressing to a homogeneous fusion welded composite wherein the cellular structure of both seeds in the mixture is broken and the oil homogeneously admixed and distributed throughout the mass.

Where the product is used for particular animals, the low oil cereal material is selected as optimum for the particular food. In some animal foods, for example for cattle food, alfalfa may be substituted in part for the cereal grain. Where the product is to be used as a poultry feed, a high mineral grit content may be added such as calcium carbonate or phosphate. The base may have further added thereto usual additives common for finishing the base to a desirable marketable food product to vary the taste, appearance, size, hardness, moisture content, palatability and other factors commonly added to solid foods.

In practicing the present invention, the cereal grain is first dried to remove enough of the excess or field moisture content to give a product from which water will not be expressed during cracking or grinding; for example, to a moisture content of about less than 11% usually in the range of about 8 to 11%. The partially dried seed and grain are separately crushed into small fragments. For example, soy bean is usually broken into quarters, the condition and size which is normal for pressing to remove oil therefrom, and the cereal grain is cracked to fine granules such as of the order of chick size, the broken oil seed and grain are then fed in desired proportions to a common grain drier such as a rotary steam drier usually operated in a temperature range of 255° to 275° F. by passage of steam through pipes mounted in the rotary drier but without direct contact of steam with the grain or seed other than heat exchange. A suitable drier is the well known Anderson Drier having this structure, as described. The proportionally and homogeneously mixed oil seed and grain fragments are dried to a moisture content of about 3% or less.

It will be understood that the preliminary drying step is merely to reduce the excess moisture content for cracking to desirable mixing and pressing size. Where the moisture content is naturally below about 11% or where the grain is small enough to blend and press without cracking or may be cracked or cut by unusual methods wherein excessive moisture does not interfere, the preliminary drying step may be omitted. In any case the moisture of both the cereal grain and oil seed either before or after admixture is desirably reduced to below about 3% before pressing. Inasmuch as the pressing is desirably effected upon the mixture while at raised temperature, it is most efficient to mix the grains while heating the mixture to effect drying to less than about 3% moisture content.

The hot dried mixture is next passed to a steam jacketed conveyor such as a Schneken, which is a worm or helical feed type conveyor which places the grain under a preliminary feed pressure, the grain being further heated by heat transfer from the steam jacket, the temperature of the mixture being maintained at approximately that of the drier, or slightly higher, in the range of 260 to 275° F. supplied by steam in the jacket at about 110 p. s. i. pressure.

The mixture, as compressed by the helical screw Schneken conveyor is fed into a standard oil seed oil expeller. The oil seed type expeller consists of a helical worm screw press, sometimes known as a rotary screw oil mill, shown typically as an Anderson mill, described in U. S. Patent 2,471,920 which raises the grain and seed mixture to a pressure of 3000 to 4000 lbs. per square inch which is high enough to break the cellular structure of the grain and, for ordinary oil seed, would expel the oil through a series of knife-like bars surrounding the helical screw as a cage according to the well known standard oil expeller construction. However, in the present method, inasmuch as the quantity of the oil seed has been adjusted with respect to the cereal seed so that the total oil content is insufficient to be expelled, the oil is merely homogeneously redistributed in the mixture and simultaneously the cellular structure of the seed and grain is broken to a fusion welded plastified or caramelized mash which flows as a homogeneous mash axially through the press as urged by the helical screw. While being homogeneously pressed in the Anderson oil expeller press, the temperature of the product is maintained at about 250° to 275° F.

The hot plastic base after being expelled from the press is cooled and broken into relatively large, such as large pea or bean size, rough granules. It is empirically dry and could be ground to a powder or smaller granular fragments as desired. It is preferred, however, in order to accelerate cooling of the hot mass as ejected from the press, to spray the same with a light mist of water which causes the product to reabsorb from about 5 to 10% of moisture which does not change its empirical solid dry character, the replaced moisture content serving to improve the palatability as well as to rapidly cool the product. The homogenized base after pressure homogenization in the oil seed expeller, with or without adjusting its moisture content, may be broken to fine granules or large pea size lumps or even powdered, or it may be molded into cubes, tablets, pellets or otherwise shaped into desirable forms such as cakes or bones and then packaged as a desired food base or further modified.

Reference is made to the attached flow sheet comprising the single figure of a drawing herewith illustrating the process as described. As shown therein diagrammatically, oil seed such as soybean and cereal seed such as corn are separately dried, the oil seed in a chamber 10 and the cereal seed in a chamber 11, to a moisture content of about 11% or less. The oil seed is then broken by a cracking roll breaker 12 into quarters and the cereal seed is broken by a cracking roll 13 to chick size.

From the cracking rolls each are fed by proportionating feeders 14 feeding about 10 to 15% soybean and 85 to 90% corn, variable more widely as stated above for other oil seeds and cereal grains, to the rotary steam drier 15 wherein the products are evenly mixed and the moisture content is reduced to about 3% or less and the product is heated to the range of 255 to 275° F. The hot dry mixture then passes to the steam jacketed Schneken conveyor from which the mixture is fed under pressure to the Anderson oil expeller 17 where the mixture is formed into a pressure homogenized, caramelaceous and fusion welded product.

The hot extruded product of the oil press in relatively large size may rapidly cool on exposure to air and may be conveyed directly to a breaker 18 which breaks or granulates the hard and brittle product to small lumps such as large pea size which is optimum for a food base with which other components may be blended to form finished food for its desired comestible use. However, inasmuch as the product is excessively dry and friable and hot, it is preferred to pass the extruded product to a moisture tempering zone which may be an open helical screw conveyor 19 which has mounted thereabove several spray nozzles 20 which spray the product with a fine mist of water which is rapidly reabsorbed by the low moisture content product to rebuild the moisture content up to about 10% which makes the product more palatable and more rapidly cools the same. The moisture tempered and cooled product may then be passed to the ganulating breaker 18. The moisture tempering zone 19 may be bypassed as illustrated.

After breaking of the product to desired size of granules it may be sifted to remove fines in a sifter reel 21, the fines being recycled to an earlier stage such as the Schneken conveyor or if desired the fines may be returned to the mixer or other convenient point for readdition to the grain and oil seed mix prior to pressing. The granules from the sifter may be passed to storage 22 or directly to a packaging unit for packaging as an intermediate food base product for further processing treatment to be applied elsewhere, where the product is merely to be manufactured and sold as a food blending base. However, it may be desired to directly blend the granulated food base with other desirable food additives to convert the same to a final food product which will be done in a zone 23 prior to packaging or storage. Where it is desired to form the intermediate product into more desirable shape by molding the same, the granules may be passed from the sifter reel or directly from the breaker, since sifting will be unnecessary, to a suitable molding device 24 to form the same to suitable shape. Where the product is molded the granulation may be to any desired size and even to powders suitable for molding. The molding, of course, may be performed upon the final blended food product, in which event it will first go through a blending stage and then to the molding device, or may be molded as an intermediate food base product which may be further blended with food additives. Moreover, where the food additive is of a character which is not affected by the temperature range desired for homogeneous oil distribution such as minerals or salt, such additives may be added to the raw mix such as in the rotary dryer prior to pressure homogenization.

*Example 1*

Corn is first dried to a moisture content of approximately 11% and then sent to a cracker and finally to a dry storage bin. Simultaneously, soy bean is dried to 11%, cracked into quarters and it is sent to a storage bin. From both corn and soy bean storage, proportional feeders feed the broken grain and oil seed to a rotary steam drier which mixes the two products in preferred proportions of 87½% corn to 12½% soy bean, by weight, and reduces the moisture content of the mixture to about 3% while raising the temperature thereof to about 260° F. From the steam drier they are conveyed by a steam jacketed Schneken conveyor having a helical screw rotated therein which conveys the hot mixture under pressure of about 5 lbs. and a temperature of about 270° F. to an Anderson oil expeller which subjects the mixture to a pressure of between 3000 and 4000 lbs. per square inch, breaks the cellular structure and causes the entire mass to flow under such pressure as a plastified mass, to be exuded as a caramelized, taffy-like-product in which the oil has become homogeneously distributed. No oil is expelled. The fused fusion welded and brittle product as exuded from the end of the Anderson press, is sprayed with a fine mist of water to cool the same and impart thereto an ultimate moisture content of about 10% and is finally broken to a size approximating large peas. The product in this cool granular form is highly brittle and may be packaged directly as a food base either for humans or animals. Most desirably it will be blended with other components to make a finished food product thereof. It may be mixed with minerals, salt, condiments, limestone fragments, phosphate rock fragments, flavoring, coloring materials, sugar, vitamins, and chlorophyll, depending on the type of food desired.

*Example 2*

A desirable dog food is prepared by mixing with the pea sized granular product of Example 1 small quantities of minerals, salts, and other flavoring materials. In addition, for forming a completed dog food, it is desirable to add fish or meat scraps which will be dried to the same order of moisture content, approximately 10% as the granular food base to avoid moisture exchange. Such additional additives may range from 10 to 50% of the food base preferably about 25%. In addition it is sometimes desired to add chlorophyll.

*Example 3*

A desirable poultry food is formed by adding 15 to 20% of minerals, primarily grit materials such as limestone in fine particle size. 15 parts of limestone in crushed fragments of about 10 mesh size, 87½ parts of corn in chick size, and 12½ parts of soy bean in quarter size are added to the rotary mixer and drier, homogeneously mixed and dried to about 3% moisture and then homogeneously compressed in the manner described in Example 1 to prepare a poultry feed. The particles will be broken to smaller size standard for chicken feed.

Certain modifications will occur to those skilled in the art. Thus it may be desirable to remove the cereal grain or oil seed hull and other parts of the grain such as the germ prior to pressing the same to a homogeneous product with the oil seed. Moreover, certain variations in palatability as well as the type of edible oil may be made in the composite product by using mixtures of the cereal seeds with each other and with the oil seed to form the composite. In such case a preliminary mixture of corn and wheat, or corn or wheat with barley, rye, oats, etc., or any two or more of such cereal grains are mixed in the above stated proportions with sufficient oil seed to impart a higher oil content to the mixture of cereal grains.

It will further be understood that the cracking of the grain preliminary to pressing is desirable only to break the grain and oil seed to a size small enough to press to homogeneous form. However, the cereal grains may be cracked to even finer sizes such as fine grit, meal or flour prior to admixture but there is no need for such fine comminution, and any size between fine chick size and coarse granules will be sufficiently small for pressure homogenization and finer sizing is unnecessary and uneconomical.

I claim:

1. An empirically non-oily dry non-cellular and oil-distributing pressure fused food product comprising a substantially homogeneous non-cellular blend of a cereal grain and an oil seed, each adjusted in proportion to the other to impart an edible oil content to the blend in the range of about 3 to 6%, said product being formed by mixing the cereal grain and oil seed in said proportions and heating and pressing the mixture at a pressure exceeding about 3000 p. s. i. and a temperature exceeding about 250° F.

2. An empirically non-oily dry non-cellular oil-distributing pressure fused food product comprising a substantially homogeneous non-cellular blend of a cereal grain in major proportion with an oil seed in proportion to raise the edible oil content of the blend to the range of 3 to 6%, said product being formed by mixing the cereal grain and oil seed, each dried to less than about 3% moisture content and heating and pressing the mixture at a pressure exceeding about 3000 p. s. i. and a temperature in the range of about 250 to 275° F.

3. An empirically non-oily dry non-cellular oil-distributing pressure fused food product comprising a substantially homogeneous non-cellular blend of a cereal grain in major proportion with an oil seed in minor proportion sufficient to raise the edible content of the blend to a range of 3 to 6%, said blend being formed by pressing a mixture of cereal grain and oil seed having less than about 3% moisture content at a pressure in the range of about 3000 to 4000 p. s. i. and a temperature in the range of about 250 to 275° F.

4. A corn product homogenized by application of a cell-destroying and oil-distributing pressure upon a mixture of said cereal grain with an oil seed in quantity sufficient to impart an oil content to said homogeneous product in the range of 4½ to 5½%, said product being formed by pressing a mixture of corn and oil seed under a pressure at a pressure exceeding about 3000 p. s. i. and a temperature in the range of about 250 to 275° F. normally sufficient to express oil from said oil seed and substantially destroy the cellular structure thereof, said oil seed being present in quantity merely sufficient to redistribute said oil in said blend while under oil expelling pressure without substantially exuding oil from the blend.

5. A corn product homogenized by application of a cell-destroying and oil-distributing pressure upon a mixture of said cereal grain with soy bean in proportion of 80 to 95% of corn and 5 to 20% of soy bean, the homogeneous product containing 4½ to 5½% of edible oils naturally contained in the composite homogeneously distributed throughout by pressing a cellular granular mixture thereof dried to a moisture content of less than about 3% under pressure at a pressure exceeding about 3000 p. s. i. and a temperature in the range of about 250 to 275° F. normally sufficient to expel oil and moisture from said soy bean and destroy the cellular structure.

6. A wheat product homogenized by application of a cell-destroying and oil-distributing pressure upon a mixture of said cereal grain with oil seed in proportion of 80 to 95% of wheat and 5 to 20% of soy bean, the homogeneous product containing 4½ to 5½% of edible oils naturally contained in the composite homogeneously distributed throughout by pressing a cellular granular mixture thereof dried to a moisture content of less than about 3% under pressure at a pressure exceeding about 3000 p. s. i. and a temperature in the range of about 250 to 275° F. normally sufficient to expel oil and moisture from said soy bean and destroy the cellular structure.

7. A rye product homogenized by application of a cell-destroying and oil-distributing pressure upon a mixture of said cereal grain with oil seed in proportion of 80 to 95% of rye and 5 to 20% of soy bean, the homogeneous product containing 4½ to 5½% of edible oils naturally contained in the composite homogeneously distributed throughout by pressing a cellular granular mixture thereof dried to a moisture content of less than about 3% under pressure at a pressure exceeding about 3000 p. s. i. and a temperature in the range of about 250 to 275° F. normally sufficient to expel oil and moisture from said soy bean and destroy the cellular structure.

8. A barley product homogenized by application of a cell-destroying and oil-distributing pressure upon a mixture of said cereal grain with oil seed in proportion of 80 to 95% of barley and 5 to 20% of soy bean, the homogeneous product containing 4½ to 5½% of edible oils naturally contained in the composite homogeneously distributed throughout by pressing a cellular granular mixture thereof dried to a moisture content of less than about 3% under pressure at a pressure exceeding about 3000 p. s. i. and a temperature in the range of about 250 to 275° F. normally sufficient to expel oil and moisture from said soy bean and destroy the cellular structure.

9. An oats product homogenized by application of a cell-destroying and oil-distributing pressure upon a mixture of said cereal grain with oil seed in proportion of 80 to 95% of oats and 5 to 20% of soy bean, the homogeneous product containing 4½ to 5½% of edible oils naturally contained in the composite homogeneously distributed throughout by pressing a cellular granular mixture thereof dried to a moisture content of less than about 3% under pressure at a pressure exceeding about 3000 p. s. i. and a temperature in the range of about 250 to 275° F. normally sufficient to expel oil and moisture from said soy bean and destroy the cellular structure.

10. An empirically dry cell-destroying and oil-distributing pressure-fused food product comprising a mixture of at least two cereal grains selected from the group consisting of corn, wheat, oats, rye, and barley pressure homogenized with oil seed in proportion of 80 to 95% of the mixture and 5 to 20% of soy bean, the homogeneous product containing 4½ to 5½% of edible oils naturally contained in the composite homogeneously distributed throughout by pressing a cellular granular mixture thereof dried to a moisture content of less than about 3% under pressure at a pressure exceeding about 3000 p. s. i. and a temperature in the range of about 250 to 275° F. normally sufficient to expel oil and moisture from said soy bean and destroy the cellular structure.

11. An empirically non-oily dry non-cellular oil-distributing pressure fused food product comprising a homogeneous blend of a food base and of a food additive adapted to improve its food value of the base of the character of condiments, flavoring, minerals, vitamins, and the like, said food base comprising a homogeneous cereal grain in major proportion pressure homogenized with sufficient oil seed to impart to said food base an edible oil content in the range of 3 to 6% in the blend homogeneously distributed by sufficient pressure exceeding about 3000 p. s. i. and at a temperature in the range of about 250 to 275° F., to destroy the cellular structure, both said oil seed and grain being dried to less than the pressure expellable moisture content before pressing.

12. The method of forming a food product comprising evenly mixing a major proportion of the cereal grain with a minor proportion, sufficient to impart an oil content of 3 to 6% to the mixture, of an oil seed, and heating and pressing the mixture at a pressure exceeding about 3000 p. s. i. and a temperature exceeding about 250° F. sufficient to homogeneously distribute the oil content throughout and substantially destroy the cellular structure of the mixture.

13. The method of forming a homogeneous food product comprising predominantly a cereal grain and an oil seed comprising forming an even mixture of granules of said cereal grain and oil seed, heating and drying said mixture to a moisture content not exceeding about 3% and pressing said mixture in a temperature range of about 260 to 275° F. under a pressure exceeding about 3000 p. s. i. sufficient to homogeneously break the cellular structure and distribute the oil content therein, said oil seed being present in quantity sufficient to impart an oil content to the mixture in the range of 3 to 6%.

14. The method of forming a food product comprising evenly mixing 80 to 95% of cereal grain granules with 5 to 20% of an oil seed adjusted in quantity to provide an oil content of from 3 to 6% to said mixture, heating and drying said mixture to a moisture content not exceeding about 3%, homogenizing said mixture by pressing the same at a temperature in the range of 260 to 275° F. at a normal oil seed oil expelling pressure in the range of about 3000 to 4000 p. s. i. to break the cellular structure and homogeneously redistribute the oil therein, and then re-adding moisture to said homogeneously pressed product to a moisture content up to about 10%.

15. The method as defined in claim 14 wherein the homogeneous product is granulated to fragments of about large pea size.

16. The method as defined in claim 14 wherein the product is molded to desirable shape.

References Cited in the file of this patent

UNITED STATES PATENTS

| | | |
|---|---|---|
| 59,255 | Otis | Oct. 30, 1866 |
| 422,370 | Brott | Mar. 4, 1890 |
| 1,178,795 | Goldreich | Apr. 11, 1916 |

FOREIGN PATENTS

| | | |
|---|---|---|
| 6,332 | Great Britain | 1886 |
| 13,178 | Great Britain | 1894 |
| 457,603 | Great Britain | 1936 |